(12) United States Patent
Baumgartner et al.

(10) Patent No.: US 7,950,502 B2
(45) Date of Patent: May 31, 2011

(54) ELECTROMECHANICALLY ACTUATED DISC BRAKE WITH GUIDE PLATE

(75) Inventors: Johann Baumgartner, Moosburg (DE); Robert Gruber, Olching (DE); Robert Trimpe, Wessling (DE)

(73) Assignee: KNORR-BREMSE Systeme Fuer Nutzfahrzeuge GmbH, Munich (DE)

( * ) Notice: Subject to any disclaimer, the term of this patent is extended or adjusted under 35 U.S.C. 154(b) by 209 days.

(21) Appl. No.: 12/364,939

(22) Filed: Feb. 3, 2009

(65) Prior Publication Data

US 2009/0194377 A1  Aug. 6, 2009

Related U.S. Application Data

(63) Continuation of application No. PCT/EP2007/006646, filed on Jul. 26, 2007.

(30) Foreign Application Priority Data

Aug. 3, 2006 (DE) .......................... 10 2006 036 278

(51) Int. Cl.
*F16D 55/02* (2006.01)

(52) U.S. Cl. ...................... 188/71.9; 188/72.2; 188/72.7; 188/196 V; 188/196 R

(58) Field of Classification Search .................. 188/71.8, 188/71.9, 72.2, 72.7, 72.8, 72.9, 196 R, 202, 188/196 V See application file for complete search history.

(56) References Cited

U.S. PATENT DOCUMENTS

| | | | | |
|---|---|---|---|---|
| 2,655,229 | A * | 10/1953 | Eksergian | 188/72.2 |
| 2,888,102 | A * | 5/1959 | Eksergian et al. | 188/71.9 |
| 3,047,098 | A * | 7/1962 | Olley | 188/72.6 |
| 3,321,049 | A * | 5/1967 | Swift | 188/71.9 |
| 6,311,809 | B1 * | 11/2001 | Thomas et al. | 188/72.9 |
| 2004/0026181 | A1 | 2/2004 | Baumgartner et al. | |
| 2004/0108175 | A1 | 6/2004 | Schautt | |
| 2009/0188761 | A1* | 7/2009 | Baumgartner et al. | 188/72.2 |

FOREIGN PATENT DOCUMENTS

| | | |
|---|---|---|
| DE | 101 39 913 A1 | 9/2002 |
| DE | 101 56 348 C1 | 4/2003 |
| DE | 10 2005 030 618 A1 | 4/2006 |
| WO | WO 03/071150 A1 | 8/2003 |
| WO | WO 2006/042726 A1 | 4/2006 |

OTHER PUBLICATIONS

International Search Report dated Oct. 29, 2007 w/English translation (four (4) pages).

* cited by examiner

*Primary Examiner* — Xuan Lan Nguyen
(74) *Attorney, Agent, or Firm* — Crowell & Moring LLP

(57) ABSTRACT

A self-boosting electromechanically actuable disc brake is characterized in that a component (pressure piston 9, 10), which is stationary during braking and which is connected to an adjusting device or is part of the adjusting device, of the self-boosting device is held, with slight play parallel to the brake disc rotational axis, between guide faces (29, 30) of that component (31) of the brake which is fixed with respect to the axle, in such a way that, during braking operations, the tangential forces which occur are supported directly by the stationary component of the self-boosting device on the component (31) of the brake which is fixed with respect to the axle.

17 Claims, 2 Drawing Sheets

ELECTROMECHANICALLY ACTUATED DISC BRAKE WITH GUIDE PLATE

CROSS-REFERENCE TO RELATED APPLICATIONS

This application is a continuation of PCT International Application No. PCT/EP2007/006646, filed Jul. 26, 2007, which claims priority under 35 U.S.C. §119 to German Patent Application No. DE 10 2006 036 278.0, filed Aug. 3, 2006, the entire disclosures of which are herein expressly incorporated by reference.

This application contains subject matter related to U.S. Application Ser. No. 12/364,956, entitled "Electromechanically Actuable Disc Brake With Actuating Plunger," filed on Feb. 3, 2009.

BACKGROUND AND SUMMARY OF THE INVENTION

The invention relates to an electromechanically actuated disc brake having a self-boosting design.

Disc brakes, which reduce the power demand of the drive, by utilizing self-boosting effects have been known for a long time.

Typical examples of brakes of this type are described for example in DE 101 56 348 C1, in the slightly older, generic patent application DE 101 39 913.8 and in DE 10 2005 030 618.7.

Brakes of such design have in common the fact that the support of the tangential forces, which act on the brake pad, takes place by way of a wedge or ramp system, which provides the self-boosting action.

Here, the friction force which acts on the brake pad is transmitted by a part, which is connected to the brake pad and which is movable with the latter in the tangential direction, of the self-boosting device via rolling bodies or by way of sliding contact against a part, which is stationary in the tangential direction, of the self-boosting device.

In brakes which are not fitted with a wear adjusting device, the transmission of force takes place directly from the stationary part to the brake caliper.

However, if a wear adjusting device is used, as is conventional in disc brakes for utility vehicle applications, it is advantageous if a part, which is stationary during braking processes, of the self-boosting device is connected to pistons of the wear adjusting device which are adjustable in length and which are provided with a guide system via which tangential forces are dissipated to the brake caliper.

As a result of the transmission of the high tangential forces, which may be greater than 80 kN in the case of a disc brake for heavy utility vehicles, wear to the sensitive components of the wear adjusting device occurs and it is necessary for those components to be dimensioned to be excessively large in relation to their actual purpose.

In the case of a design of the brake as a sliding-caliper brake, the described problem occurs to an increased extent since the tangential forces must, in this case, additionally be transmitted from the brake caliper via its sliding guide to the axially fixed brake carrier.

FIG. 3 of WO 03/071150 A1 describes a brake design in which the tangential forces of the stationary part of the self-boosting device are transmitted, so as to be supported, directly to the brake frame. The stationary component has a very massive design since the actuating force is generated between the component and the pressure plate. In the case of the design as a sliding-caliper brake, it is necessary here for the tangential forces to be dissipated via the sliding guide of the brake caliper.

The invention is based on the object of further developing a self-boosting disc brake such that sensitive components of a wear adjusting device and/or of a caliper sliding guide are less highly loaded.

The invention achieves this, and other, objects by providing a self-boosting electromechanically actuable disc brake having an axially fixed component, a brake caliper which is movable relative to the axially fixed component, at least one application-side and one reaction-side brake pad, and a brake disc. An electromechanical drive and a brake application device for applying the brake pad are provided, which brake application device has a self-boosting device. At least one wear adjusting device for adjusting brake pad and/or disc wear is also provided. The self-boosting device includes a component which is stationary during braking processes but which is movable parallel to the brake disc rotational axis during adjusting movements, the component being connected to or being part of the wear adjusting device. The component, which is stationary during braking processes, of the self-boosting device is held, with a small degree of play, parallel to the brake disc rotational axis between guide surfaces of the axially fixed component of the brake, such that, during braking processes, the tangential forces which occur are transmitted, so as to be supported, directly from the stationary component of the self-boosting device to the axially fixed component of the brake.

According thereto, the stationary component of the self-boosting device, which stationary component is connected to the adjusting device, is held, with a small degree of play, parallel to the brake disc rotational axis between guide surfaces of the axially fixed component of the brake, in such a way that, during braking processes, the tangential forces which occur are transmitted, so as to be supported, directly from the stationary component of the self-boosting device to the axially fixed component of the brake.

In this way, a disc brake of a self-boosting design is created in which the transmission of the tangential force, which is introduced from the brake pad into the self-boosting device, to the axially fixed component of the brake takes place such that sensitive components of the wear adjusting device and/or of the caliper sliding guide are no longer acted upon by the forces.

The invention is particularly advantageously applied to sliding-caliper brakes. In such a case, the axially fixed component is preferably the brake carrier of the sliding-caliper brake. In contrast to conventional sliding-caliper disc brakes for utility vehicles, therefore, it is no longer the brake pad which is supported directly on the brake carrier, but rather one or more adjusting devices formed as a pressure ram.

The sliding caliper itself, the wear adjusting system which is situated in the caliper, and the sliding guide of the caliper are relieved of the load of the occurring tangential forces, since those forces are dissipated directly from the guide plate to the brake carrier.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
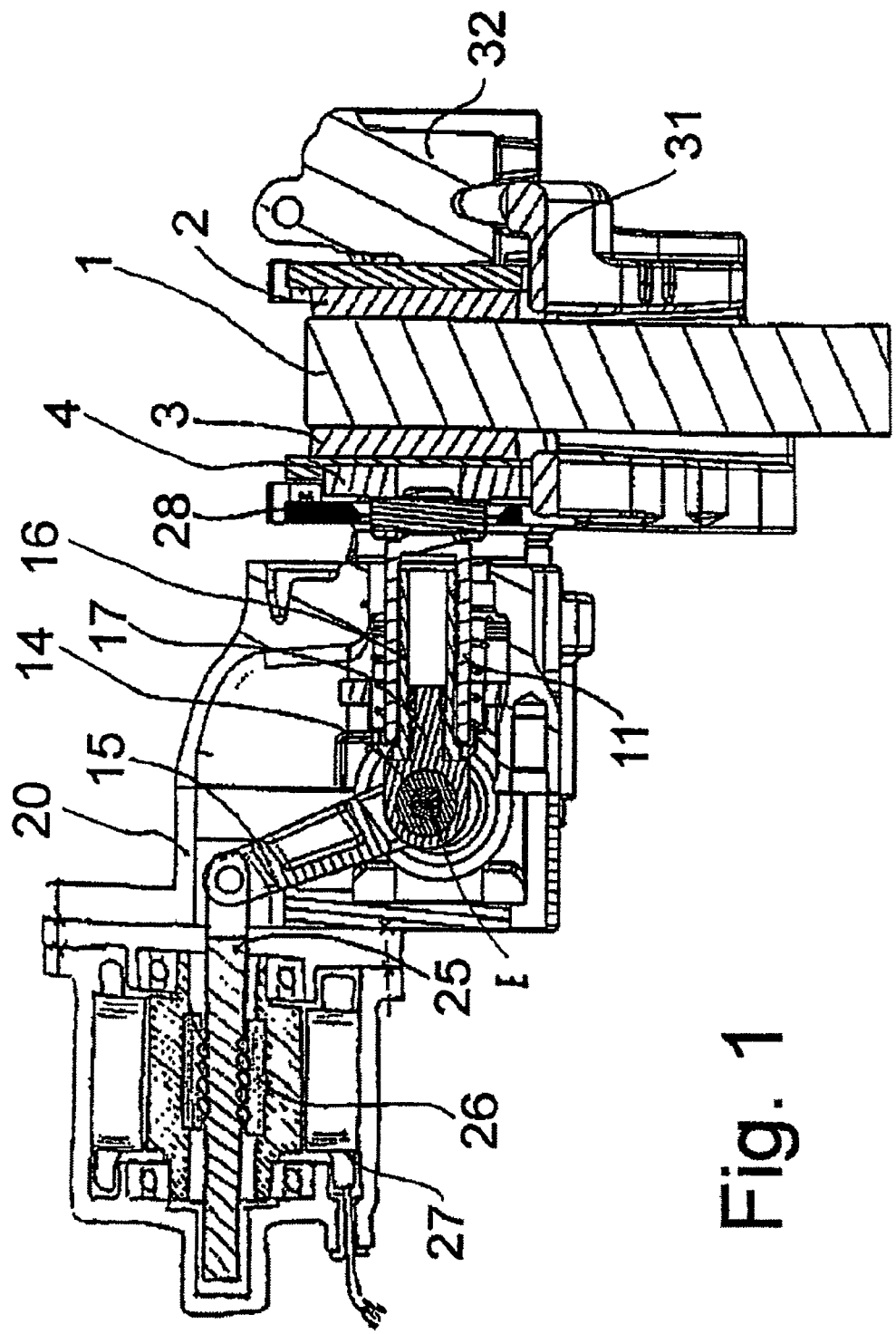
FIG. 1 is a first sectioned view through a sliding-caliper disc brake.
Figure 2:
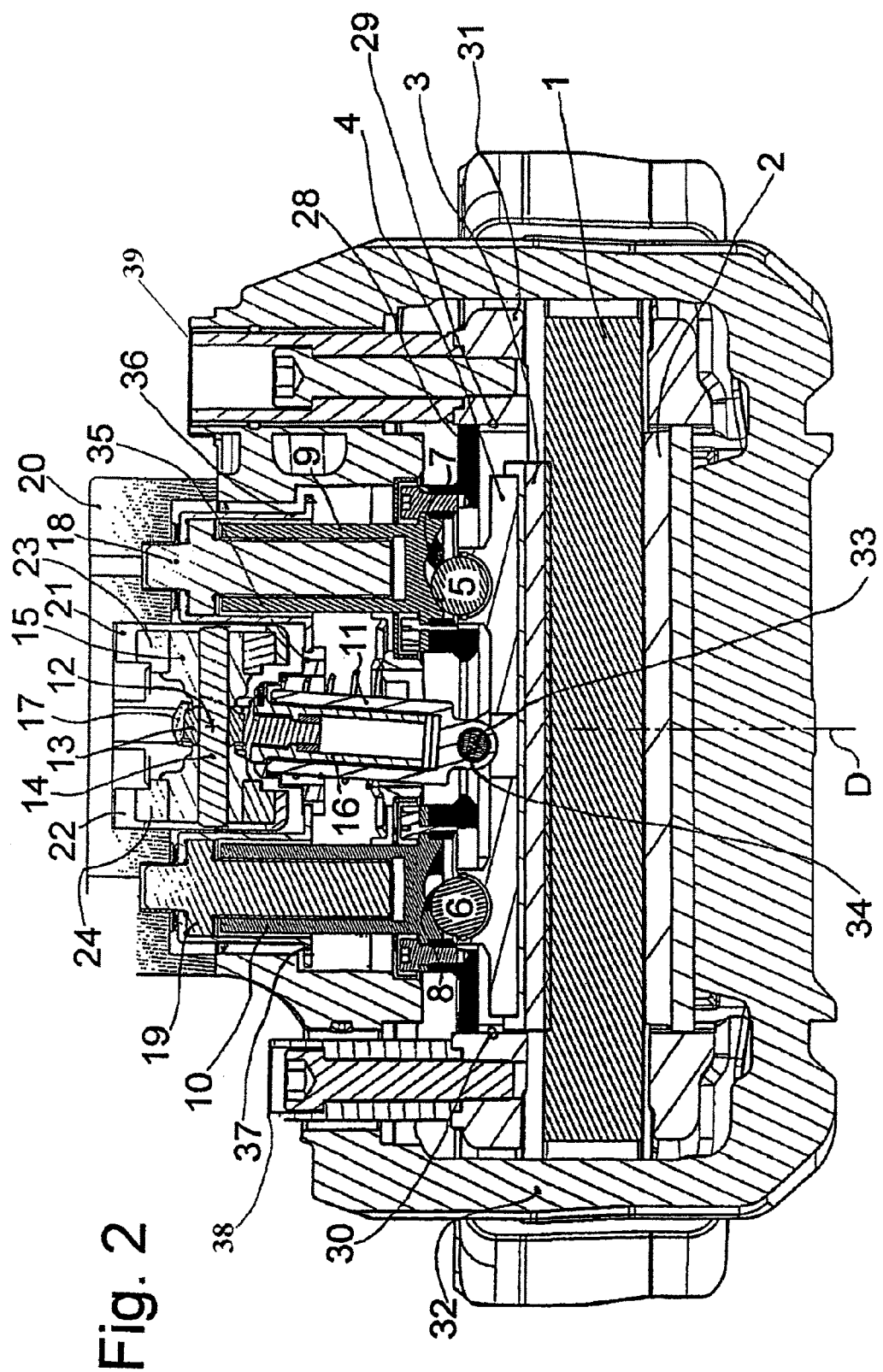
FIG. 2 is a further sectioned view through the disc brake of FIG. 1.

FIG. 1 shows an electromechanically actuable sliding-caliper disc brake having brake pads 2 and 3 arranged at both sides of a brake disc 1.

The sliding-caliper disc brake includes a caliper 32 (with a caliper cover 20) which straddles over the brake disc 1 in a peripheral edge region and which is of a one-piece or, in this case, multi-part design and which contains a brake application device. The brake caliper 32 is movably guided by a caliper sliding guide on an axially fixed brake carrier 31.

An electric motor 27 on the brake housing 20 acts via a threaded drive, in this case a ball screw drive 26, on a brake rotary lever 15, which is preferably mounted eccentrically in the brake caliper 20 and which, as a result of an actuation by the ball screw drive, can be pivoted about a rotational axis which is aligned perpendicular to the brake disc rotational axis D.

The brake rotary lever 15 acts, in turn, via at least one brake plunger or ram 11 directly or via a pressure plate 4 on an application-side brake pad 3.

Here, the brake ram 11 and the brake rotary lever 15 (and also the brake ram 11 and the pressure plate 4), are articulatedly connected to one another such that the brake ram 11 can, during the application of the disc brake, completely or at least substantially follow a movement of the application-side brake pad 3 in the tangential direction of the brake disc 1.

Here, the brake application device is designed such that tensile and compressive forces can act on the brake pad 3, that is to say the electric motor can be utilized for applying and releasing the brake.

The actuation-side brake pad 3 is held in the pressure plate 4.

The pressure plate 4 is movable parallel to the brake disc friction surface and is operatively connected, by means of rolling bodies, in this case balls 5 and 6, which are mounted therein, to ramps 7 and 8 of pressure rams or adjusting pistons 9 and 10 which are axially adjustable in length and which are aligned at an acute angle of greater than 0 and less than 90° with respect to the brake disc friction surface. The ramps 7, 8 could also or additionally be formed in the pressure plate 4. The balls (or other rolling bodies) would in this case be guided in spherical recesses of the pressure rams 9, 10, which would nevertheless be part of the self-boosting device within the context of the invention.

As already mentioned, the actuating ram 11 is articulatedly connected to the pressure plate 4 to transmit the compressive and tensile forces, which act in the direction of the brake disc. The articulated connection is provided here by way of a journal 33 and a fork head 34. The articulated connection permits, in the event of a tangential movement of the pressure plate 4, a pivoting movement of the actuating ram 11 about the ball central point 12 of a spherical bearing 13. The spherical bearing 13 is held on the eccentric axle shaft 14 of the brake rotary lever 15 to transmit the actuating forces to the actuating ram 11.

The actuating ram 11 is screwed to a threaded piston 16, with the threaded piston 16 in turn being fixedly connected to a joint bearing housing 17.

The actuating ram 11 forms, with the threaded piston 16, a plunger or adjusting piston, which is variable in length for the purpose of wear adjustment.

In the same way, the two pressure rams 9 and 10 are screwed to threaded spindles 18 and 19, which transmit the supporting force of the pressure rams 9/10 to the brake caliper/cover 32/20.

The threaded spindles 18/19 are connected to the threaded piston 17 by a synchronization gearing. In this way, it is obtained that the drive rotational movement of the adjusting drive acts only synchronously on the two pressure rams 9/10 and the actuating ram 11.

The brake rotary lever 15 is mounted in a low-friction manner in the two bearing blocks 21/22 by way of two rolling bearings 23/24. The bearing blocks 21/22 are fixedly connected to the brake caliper/cover 32/20.

A spindle 25 of a ball screw drive 26 is fastened to the lever arm of the brake rotary lever 15 to transmit tensile and compressive actuating forces.

To actuate the brake, the ball screw drive 26 is driven by the electric motor 27.

The pressure rams 9/10, at their end facing the brake disc 1, are held in a guide plate 28, or are designed, in such a way that, on the ramps 7/8, support forces which act parallel to the brake disc friction surface are introduced into the guide plate 28 and are dissipated from the latter, depending on the rotational direction of the brake disc, to the guide surfaces 29 or 30 on the brake carrier 31.

The guidance of the pressure rams 9/10 and of the actuating ram 11 takes place, at that end thereof which faces toward the brake disc 1, exclusively by the guide plate 28 and the brake carrier 31.

The brake caliper 32, adjusting device 35/36/37 and the caliper sliding guide 38/39 are relieved of the load of the tangential forces.

Here, the brake rams 9, 10 are preferably simply screwed directly to the guide plate 28.

A braking process using the disc brake will be described by way of example.

In the event of a braking demand by the actuation of the brake pedal and therefore of the brake setpoint value transducer which is connected to the brake pedal being detected, the electric motor 27 is activated by an electronic brake control unit in order to generate an application movement of the ball screw drive 26.

The spindle 25 of the ball screw drive 26 moves the lever arm of the brake rotary lever 15 in the direction of the brake disc.

Here, the brake rotary lever 15 is pivoted in its bearings 23/24 and therefore also moves its eccentric shaft 14, and therefore the spherical bearing 13, in the direction of the brake disc corresponding to the lever ratio. The movement of the spherical bearing 13 is transmitted to the pressure plate 4 via the actuating ram, or via the component chain 12→13→17→16→11→33→34.

Here, the pressure plate 4 with the brake pad 3 is moved, initially so as to overcome the air play (gap) and at right angles to the friction surface of the brake pad 3, in the direction of the brake disc 1. When the brake pad 3 comes into contact with the friction surface of the brake disc 1, the brake pad 3 and the pressure plate 4 which is connected thereto are also moved, by the friction force of the brake disc 1 which is generated, in the rotational direction of the brake disc 1.

The balls 5/6 are guided along on the ramps 7/8 and, here, bring about an intensified movement of the pressure plate 4 in the direction of the brake disc in addition to the tangential movement of the pressure plate 4. The contact force which is introduced by the actuating ram 11 is boosted here corresponding to the increased spread of the brake caliper 32. As a result of the tangential movement of the pressure plate 4, the actuating ram 11 performs a pivoting movement about the spherical bearing 13 and the journal 33. The reaction-side brake pad 2 is, as is conventional in sliding-caliper brakes, moved into contact with the brake disc 3 as a result of a movement of the brake caliper. It is not necessary to provide a self-boosting device, on the reaction side.

| Table of Reference Symbols | |
|---|---|
| Brake disc | 1 |
| Brake pads | 2, 3 |
| Pressure plate | 4 |
| Balls | 5 and 6 |
| Ramps | 7 and 8 |
| Pressure ram | 9 and 10 |
| Actuating ram | 11 |
| Ball central point | 12 |
| Spherical bearing | 13 |
| Eccentric axle | 14 |
| Brake rotary lever | 15 |
| Threaded piston | 16 |
| Joint bearing housing | 17 |
| Threaded spindles | 18 and 19 |
| Brake caliper cover | 20 |
| Bearing blocks | 21/22 |
| Rolling bearings | 23/24 |
| Spindle | 25 |
| Ball screw drive | 26 |
| Electric motor | 27 |
| Guide plate | 28 |
| Guide surfaces | 29 or 30 |
| Brake carrier | 31 |
| Brake caliper | 32 |
| Journal | 33 |
| Fork head | 34 |
| Wear adjusting device | 35/36/37 |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A self-boosting electromechanically actuable disc brake, comprising:
    an axially fixed component;
    a caliper moveable relative to the axially fixed component;
    at least one application-side and one reaction-side brake pad;
    a brake disc straddled by the caliper;
    an electromechanical drive and a brake application device for applying the brake pads, the brake application device having a self-boosting device;
    at least one wear adjusting device for adjusting for wear of at least one of the brake pads and the brake disc;
    wherein the self-boosting device comprises a component stationarily arranged during braking processes but being moveable parallel to a rotational axis of the brake disc during wear adjusting movements, said component being coupled to or part of the wear adjusting device; and
    wherein said component is held, with a small degree of play, parallel to the rotational axis of the brake disc between guide surfaces of the axially fixed component such that, during the braking processes, tangential forces which occur are supported directly by the component on the axially fixed component of the disc brake.

2. The disc brake as claimed in claim 1, wherein the axially fixed component is a brake carrier with said guide surfaces, on carrier which the caliper is movably guided.

3. The disc brake as claimed in claim 1, wherein the wear adjusting device has at least one or more pressure rams which, at their end facing toward the brake disc, are held in a guide plate, which pressure rams and guide plate together form said component, which is stationary during braking processes, of the self-boosting device.

4. The disc brake as claimed in claim 3, wherein the pressure rams are, in each case, part of a nut and spindle unit, which is axially variable in length.

5. The disc brake as claimed in claim 3, wherein the guide plate has two guide surfaces at which, on ramps, support forces which act parallel to the brake disc friction surface and forces which are introduced into the guide plate are dissipated, depending on a rotational direction of the brake disc, to the guide surfaces of the brake carrier.

6. The disc brake as claimed in claim 4, wherein the guide plate has two guide surfaces at which, on ramps, support forces which act parallel to the brake disc friction surface and forces which are introduced into the guide plate are dissipated, depending on a rotational direction of the brake disc, to the guide surfaces of the brake carrier.

7. The disc brake as claimed in claim 3, wherein guidance of the pressure rams takes place, in that region thereof which faces toward the brake disc, exclusively by the guide plate and the brake carrier.

8. The disc brake as claimed in claim 7, wherein guidance of the pressure rams takes place, in that region thereof which faces toward the brake disc, exclusively by the guide plate and the brake carrier.

9. The disc brake as claimed in claim 3, wherein the brake rams are screwed to the guide plate.

10. The disc brake as claimed in claim 7, wherein the brake rams are screwed to the guide plate.

11. The disc brake as claimed in claim 3, wherein the brake rams are composed of spindles and nuts, and wherein the brake rams are supported, at their side facing away from the guide surface, on an inside of the brake caliper.

12. The disc brake as claimed in claim 7, wherein the brake rams are composed of spindles and nuts, and wherein the brake rams are supported, at their side facing away from the guide surface, on an inside of the brake caliper.

13. The disc brake as claimed in claim 10, wherein the brake rams are composed of spindles and nuts, and wherein the brake rams are supported, at their side facing away from the guide surface, on an inside of the brake caliper.

14. A self-boosting disc brake having a brake disc, the disc brake comprising:
    a first component configured to be fixed with respect to an axle when installed;
    a caliper moveably mounted relative to the first component;
    a brake application device arranged in the caliper for applying brake pads against the brake disc, the brake application device including a self-boosting device;
    a wear adjusting device for adjusting wear of at least one of the brake pads and the brake disc;
    wherein the self-boosting device comprises a second component stationarily arranged during braking processes but being moveable in parallel to a brake disc rotational axis during operation of the wear adjusting device, said second component being held substantially parallel to the rotational axis of the brake disc with a limited amount of play between guide surfaces of the first component; and whereby during braking processes, tangential forces occurring are supported directly by the second component of the self-boosting device on the first component of the disc brake that is fixed with respect to the axle when installed.

15. The disc brake according to claim 14, wherein the first component is a brake carrier.

16. The disc brake according to claim 14, further comprising a guide plate, said wear adjusting device having at least one or more pressure rams which, at an end facing toward the brake disc are held in the guide plate, the one or more pressure rams and guide plate together forming the second component which is stationary during braking processes.

17. The disc brake according to claim 16, wherein the one or more pressure rams each comprise a nut and spindle unit having an axially variable length.

* * * * *